(12) United States Patent
Yuki et al.

(10) Patent No.: US 8,097,331 B2
(45) Date of Patent: *Jan. 17, 2012

(54) MOLD RELEASE SHEET (75) Inventors: Tetsuya Yuki, Kanonji (JP); Yoshiaki Hirose, Kanonji (JP)

(73) Assignee: Toyo Tanso Co., Ltd., Osaka-shi (JP)

( * ) Notice: Subject to any disclaimer, the term of this patent is extended or adjusted under 35 U.S.C. 154(b) by 261 days.

This patent is subject to a terminal disclaimer.

(21) Appl. No.: 12/375,822

(22) PCT Filed: Jul. 26, 2007

(86) PCT No.: PCT/JP2007/064649
§ 371 (c)(1),
(2), (4) Date: Jan. 30, 2009

(87) PCT Pub. No.: WO2008/015952
PCT Pub. Date: Feb. 7, 2008

(65) Prior Publication Data
US 2009/0324886 A1    Dec. 31, 2009

(30) Foreign Application Priority Data
Jul. 31, 2006  (JP) .................................. 2006-208774

(51) Int. Cl.
*B32B 7/02* (2006.01)
(52) U.S. Cl. ......... 428/212; 428/141; 428/220; 428/408
(58) Field of Classification Search .................. 428/141, 428/212, 220
See application file for complete search history.

(56) References Cited

U.S. PATENT DOCUMENTS

| | | | |
|---|---|---|---|
| 3,492,197 | A | 1/1970 | Franciszek et al. |
| 4,117,051 | A | 9/1978 | Ishikawa et al. |
| 4,888,242 | A | 12/1989 | Matsuo et al. |
| 6,133,178 | A | 10/2000 | Yamada et al. |
| 2002/0088390 | A1 | 7/2002 | Thebault et al. |
| 2003/0148104 | A1 | 8/2003 | Kahl et al. |
| 2004/0043220 | A1 | 3/2004 | Hirose et al. |
| 2005/0196613 | A1 | 9/2005 | Hirose et al. |
| 2007/0110661 | A1 | 5/2007 | Hirose |

FOREIGN PATENT DOCUMENTS

| | | |
|---|---|---|
| GB | 2446087 A | 7/2008 |
| JP | 63-139010 A | 6/1988 |
| JP | 63-149142 A | 6/1988 |
| JP | 01167210 A | 6/1989 |
| JP | 03023209 A | 1/1991 |
| JP | 03223196 A | 10/1991 |
| JP | 04-021509 A | 1/1992 |
| JP | 06-2637 B2 | 1/1994 |
| JP | 6-75717 U | 10/1994 |
| JP | 7-118067 A | 5/1995 |
| JP | 2528285 B2 | 8/1996 |
| JP | 8-333171 A | 12/1996 |
| JP | 2566244 B2 | 12/1996 |
| JP | 10-167742 A | 6/1998 |
| JP | 2923260 B2 | 7/1999 |
| JP | 11-228166 A | 8/1999 |
| JP | 11-278857 A | 10/1999 |
| JP | 2001-261481 A | 9/2001 |
| JP | 2002-226292 A | 8/2002 |
| JP | 2003-127267 A | 5/2003 |
| JP | 3410380 B2 | 5/2003 |
| JP | 2003-252615 A | 9/2003 |
| JP | 2003-267781 A | 9/2003 |
| JP | 2004-075521 A | 3/2004 |
| JP | 2006-062922 A | 3/2006 |
| JP | 2007-108048 A | 4/2007 |

OTHER PUBLICATIONS

International Search Report of PCT/JP2007/064649, date of mailing Sep. 18, 2007.
European Search Report dated Feb. 19, 2010, issued in corresponding European Patent Application No. 07791349.9.
International Search Report of PCT/JP2007/63661, date of mailing Sep. 18, 2007.
"Graphite Intercalation Compounds"; Chapter 3, New Carbon Materials, Apr. 7, 2008, pp. 38-43.
Chinese Office Action dated Feb. 12, 2011, issued in Chinese Patent Application No. 200780027632.5.

*Primary Examiner* — David Sample
*Assistant Examiner* — Lawrence Ferguson
(74) *Attorney, Agent, or Firm* — Westerman, Hattori, Daniels & Adrian, LLP (57) ABSTRACT

There is provided a mold release sheet (4) disposed between silica powder M and an inner face of an outer member 1b of a mold and made of expanded graphite. The mold release sheet has a gas permeability represented by the following equation (1) from $5.0 \times 10^{-7}$ cm$^2$/s to $1.0 \times 10^{-4}$ cm$^2$/s. Gas permeability=$Q \cdot L/(\Delta P \cdot A)$ (1). In this equation (1), Q is the gas flow rate (Pa·cm$^3$/s), $\Delta P$ is the pressure difference (Pa) between two chambers, A is the gas transmission area (cm$^2$) of the mold release sheet, which is the area of a passage that allows the two chambers to communicate with each other, and L is the thickness (cm) of the mold release sheet.

9 Claims, 6 Drawing Sheets

MOLD RELEASE SHEET

TECHNICAL FIELD

The present invention relates to mold release sheets, and more particularly to a mold release sheet used in order to separate a molded product from a mold more easily when removing the molded product from the mold.

BACKGROUND ART

When manufacturing products made of a material such as silicon carbide or aluminum nitride, the raw material such as silicon carbide accommodated in a graphitic mold or a mold container made of graphite is heated and compressed so as to be formed into the shape of the mold or the like. When the raw material is placed directly in the mold or the like and heated in such a molding process, both the raw material and the mold or the like are heated to a very high temperature. This leads to problems such as damage to the mold or the like, which results from the reaction between the raw material and the mold or the like, and contamination to the raw material, which results from the impurities contained in the mold or the like. In addition, when an evaporated gas or the like produced from the raw material comes into contact with the raw material during the molding process, a problem arises that air bubbles form in the manufactured product, resulting in poor product quality.

In view of such problems, a mold release sheet is conventionally interposed between the raw material and a mold for molding a substance. For example, in manufacturing quartz glass, a graphite sheet or a felt material made of graphite carbon fibers is interposed between silica powder and a graphitic mold (see, for example, Patent References 1 to 3 listed below).

Specifically, the just-mentioned Patent References 1 and 2 describes the use of a graphite felt or a graphite sheet having a bulk density of from 0.1-1.5 g/cm$^3$ that is refined to a high purity such that the content of the impurities Na, K, Fe, and Ti is 1 ppm or less. It is described that both the graphite felt and the graphite sheet have elasticity and air permeability. Moreover, it is described that the graphite sheet does not decrease in a large amount even when it reacts with silica powder, and that the graphite sheet is suitable to obtain flatness of the glass surface because its surfaces are smooth.

Patent Reference 3 describes that a carbon felt with a bulk density of from 0.1-0.5 g/cm$^3$ made of graphite carbon fiber is interposed at a contact portion between packed silica powder and a cylindrically constituted graphitic carbon. Patent Reference 3 also describes that the carbon felt has the function to remove evaporated silica gas and the gas produced by the reaction between the carbon felt and silica, and that the carbon felt also absorbs the thermal expansion difference between the produced glass and the cylindrically constituted graphitic carbon and therefore serves to prevent them from breaking during cooling after manufacturing the glass.

[Patent Reference 1] Japanese Unexamined Patent Publication No. 11-228166
[Patent Reference 2] Japanese Unexamined Patent Publication No. 11-278857
[Patent Reference 3] Japanese Unexamined Patent Publication No. 10-167742

DISCLOSURE OF THE INVENTION

Problems to be Solved by the Invention

Nevertheless, in Patent References 1 to 3, although the graphite felt, the graphite sheet, and the carbon felt (these are hereinafter also collectively referred to as "sheet") have a certain degree of elasticity and air permeability, these characteristics are not sufficient. Therefore, they are unable to resolve the problems such as the breakage of the mold and the glass or the like resulting from the thermal expansion difference and the occurrence of air bubbles in the products.

In addition, it is necessary to remove the sheet from the product because the sheet is adhered to the product when taking the product out of the mold. Since such removal of the sheet takes a long time, the problem arises that the production efficiency of the product degrades. However, the above-listed Patent References 1 to 3 do not mention any method for resolving such a problem.

Moreover, when the sheet adheres to the manufactured product, the surface irregularity of the sheet surface is transferred to the product surface even after the sheet has been removed from the product. If the transferred surface irregularity is large, the portion that is to be removed from the product is large. As a consequence, the work hour for removing the surface irregularity becomes long, leading to further degradation in the production efficiency. In addition, the product may also be scraped away when removing the sheet. If the amount of the product that is scraped away is large, the thickness of the product becomes thinner than the required value, so the production yield becomes poor. Conventionally, there has been no description about this point, although Patent Reference 1 only mentions that the graphite sheet has a smooth surface so it is suitable to obtain flatness of a glass surface. There is no specific suggestion as to what degree of surface accuracy of the sheet surface is required to shorten the work for removing the surface irregularity or to improve the production yield.

On the other hand, an expanded graphite sheet exists as a material that has elasticity and air permeability. The expanded graphite sheet has desirable properties as a mold release sheet because the expanded graphite sheet has flexibility, compressibility, and air permeability. However, no example can be found in which the properties of the expanded graphite sheet that are desirable for a mold release sheet are specifically considered or investigated.

In view of the foregoing circumstances, it is an object of the present invention to provide a mold release sheet, made of expanded graphite, that can keep high product quality and can remarkably improve the work efficiency and production yield when silicon carbide, aluminum nitride, or the like is produced by compressing.

Means for Solving the Problems

In order to accomplish the foregoing object, the present invention provides a mold release sheet disposed between a mold and a material to be molded, the mold release sheet comprising expanded graphite, characterized in that: the gas permeability represented by the following equation (1) is $1.0 \times 10^{-4}$ cm$^2$/s or less, $$\text{Gas permeability} = Q \cdot L / (\Delta P \cdot A), \quad (1)$$

where Q is the gas flow rate (Pa·cm$^3$/s), ΔP is the pressure difference (Pa) between two chambers, A is the gas transmission area (cm$^2$) of the mold release sheet, which is the area of a passage that allows the two chambers to communicate with each other, and L is the thickness (cm) of the mold release sheet.

By restricting the gas permeability of the mold release sheet to be very low as in the foregoing configuration, it is possible to prevent the gasified raw material and the gas produced by the reaction between the mold release sheet and the raw material from permeating through the mold release sheet when the mold release sheet is disposed between the raw material and the mold or the like in manufacturing silicon carbide, aluminum nitride, or the like. As a result, the gas and the mold are inhibited from reacting with each other. Therefore, the mold can be prevented from deteriorating.

It is desirable that the gas permeability represented by the above equation (1) be $1.0 \times 10^{-9}$ cm²/s or greater.

It is preferable that the gas permeability be as low as possible from the viewpoint of inhibiting the reaction between the gas and the mold. Nevertheless, if the gas permeability is too low, such problems arise that air bubbles form in the molded product, for example. For this reason, it is desirable that the gas permeability be $1.0 \times 10^{-9}$ cm²/s or greater.

It is desirable that the peel strength represented by the following equation (2) be 50 kPa or less:

$$\text{peel strength} = LD/(W \cdot t), \quad (2)$$

where LD is the load, t is the thickness of the mold release sheet, and W is the width of the bonded portion.

By restricting the peel strength to be low as in the above-described configuration, the work for removing the sheet that is adhered to the product can be performed easily within a short time when the manufactured product is removed from the mold. As a result, the manufacturing cost of the product can be reduced.

It is desirable that the arithmetical mean surface roughness be 10 μm or less.

When the arithmetical mean surface roughness of the mold release sheet is 10 μm or less as in the above-described configuration (i.e., when the mold release sheet surface is smooth), the smoothness of the product surface can be kept high after removing the sheet. As a result, processing after removal of the sheet becomes unnecessary, or even when it is necessary, the work hour of the processing can be shortened remarkably. Thus, the production efficiency improves significantly. In addition, the thickness reduction of the product is prevented because the amount of the portion of the product that is removed is lessened; therefore, the production yield of the product improves. Furthermore, if the surface irregularity of the mold release sheet is less, the variation in planar thermal conductivity over the surface of the sheet is correspondingly smaller; therefore, heat can be supplied uniformly to the raw material.

It is desirable that the planar thermal conductivity be 100 W/(m·K) or greater.

When the planar thermal conductivity of the mold release sheet is high as in the above-described configuration, the temperature of the raw material can be elevated quickly. Therefore, the molding time can be shortened, and as a result, the production efficiency of the product is further improved.

It is desirable that the compression ratio represented by the following equation (3) be 30% or greater:

$$\text{Compression ratio (\%)} = [(t_1 - t_2)/t_1] \times 100, \quad (3)$$

where $t_1$, is the thickness (mm) of the mold release sheet after applying a pre-load (0.686 MPa±1%) for 15 seconds, and $t_2$ is the thickness (mm) of the mold release sheet after applying a total pressure (34.3 MPa±1%) for 60 seconds.

When the compression ratio of the mold release sheet is restricted as in the above-described configuration, the mold release sheet can change its shape so that it can absorb the difference in the amount of expansion/contraction between the raw material and the mold, if the difference arises due to the difference in thermal expansion rate between the raw material and the mold. As a result, it is possible to prevent breakage of the product and the mold.

It is desirable that the compression ratio represented by the above equation (3) be 80% or less.

Generally, the higher the compression ratio is, the greater the gas permeability tends to be. However, when the compression ratio is 80% or less, the gas permeability falls within the above-described range.

It is desirable that the bulk density be from 0.5 Mg/m³ to 1.5 Mg/m³.

If the bulk density exceeds 1.5 Mg/m³, the compression ratio lowers. As a consequence, the product and the mold may break. In addition, the mold release sheet may be cracked when it is bent. On the other hand, if the bulk density is less than 0.5 Mg/m³, the gas permeability becomes great, causing deterioration or the like of the mold.

It is desirable that the thickness be 1.5 mm or less.

When the thickness of the mold release sheet is 1.5 mm or less as in the above-described configuration, the sheet can be easily bent. Therefore, the mold release sheet can be fitted to the mold easily and in a state in which the sheet is in close contact with the mold. As a result, the fitting work for the mold release sheet can be performed within a short time, whereby the overall work hour of the molding process can be shortened. Thus, the manufacturing cost of the product can be reduced.

It is desirable that the thickness be 0.2 mm or greater.

When the thickness of the mold release sheet is 0.2 mm or greater as in the above-described configuration, the mold release sheet can be hindered from cracking or the like even in the case that the mold release sheet is bent. Moreover, since the amount of deformation along a thickness direction becomes large, the product can be inhibited from being damaged.

It is desirable that the ash content be 30 mass ppm or less.

When the ash content in the mold release sheet is low as in the above-described configuration, the raw material to be molded can be prevented from being contaminated. As a result, the product quality can be improved.

Advantages of the Invention

As described above, the present invention exhibits the significant advantage that the product quality is kept high and the work efficiency and production yield are improved when silicon carbide, aluminum nitride, or the like is produced by compressing.

BEST MODE FOR CARRYING OUT THE INVENTION

Next, embodiments of the present invention will be described with reference to the drawings.

A mold release sheet according to the present invention is a sheet that is used when molding a raw material such as silicon carbide or aluminum nitride that is placed in a graphitic mold or a mold container made of graphite by heating and pressurizing, the sheet disposed between the raw material and the mold or the like.

Examples of the products that can be manufactured using the mold release sheet of the present invention include, but are not particularly limited to, synthetic quartz and SiC.

First, before explaining the mold release sheet of the present invention, how the mold release sheet of the present invention is used will be described. The following describes a case in which a cylindrical quartz glass is manufactured as a representative example.

Figure 1:
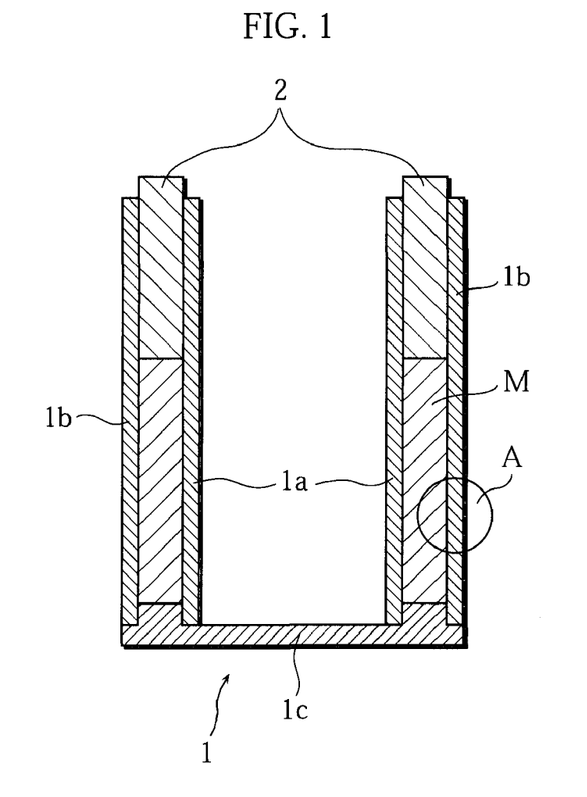

In FIG. 1, reference numeral 1 denotes a mold that accommodates silica powder M, which is the raw material for quartz glass. The mold is made of, for example, graphite. The mold 1 comprises an inner member 1a in a cylindrical shape, an outer member 1b in a cylindrical shape, and a bottom member 1c in a plate-like shape. The space surrounded by these members accommodates the silica powder M. Reference numeral 2 denotes a pressurizing member for pressurizing the silica powder M.

Figure 2:
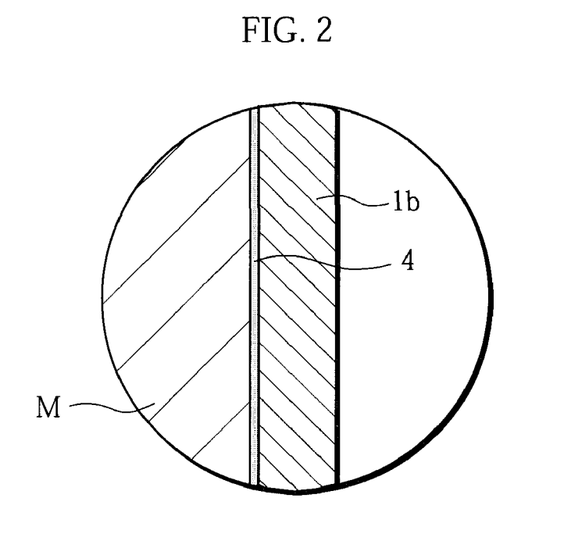
FIG. 2 is a cross-sectional view illustrating a portion A of FIG. 1 enlarged.

As illustrated in FIG. 2, a mold release sheet 4 of the present invention is disposed on an inner face of the outer member 1b of the mold 1 so that the silica powder M and the mold 1 do not come in direct contact with each other. In addition, a mold release sheet 4 of the present invention is disposed on each of an outer face of the inner member 1a, an upper face of the bottom member 1c, and a bottom surface of the pressurizing member 2 (all of which are in contact with the silica powder M).

By heating the silica powder M accommodated in the mold 1 while pressurizing it by the pressurizing member 2, a synthetic quartz in a cylindrical shape can be formed.

Next, the mold release sheet of the present invention will be described.

(Overall Structure of Mold Release Sheet)

The mold release sheet of the present invention is formed by molding expanded graphite into a sheet shape.

The expanded graphite is formed by immersing natural graphite, kish graphite, or the like into a liquid such as sulfuric acid or nitric acid, and thereafter subjecting it to a heat treatment at 400° C. or higher. The expanded graphite is in a flocculent or fiber form, and it is one in which its axial length is longer than its radial length. For example, the expanded graphite has an axial length of about 1 mm to 3 mm and a radial length of about 300 µm to 600 µm. In the interior of the mold release sheet of the present invention, filaments of the expanded graphite fiber as described above are entangled with one another.

It should be noted that the mold release sheet of the present invention may be formed of only the expanded graphite as described above, but it may contain a little amount (for example, about 5%) of binder such as a phenolic plastic or a rubber component.

(Gas Permeability of Mold Release Sheet)

The mold release sheet of the present invention is adjusted to have a gas permeability of $1.0 \times 10^{-4}$ cm$^2$/s or less. The gas permeability is represented by the foregoing equation (1).

In manufacturing metal such as silicon carbide or aluminum nitride, a gas is produced by gasification of the raw material and a reaction between the mold release sheet and the raw material. When the gas permeability of the mold release sheet is too high, a problem arises that the mold or the like made of graphite is deteriorated by the gas that permeates through the mold release sheet. However, when the gas permeability of the mold release sheet is controlled as described above, the produced gas is prevented from permeating through the mold release sheet. As a result, the deterioration (silicon-carbidization) of the mold made of graphite can be prevented, and the lifetime of the mold or the like is prolonged.

Nevertheless, when the gas permeability is made too low, problems arise that, for example, air bubbles form in the molded product. For this reason, it is preferable that the gas permeability be $1.0 \times 10^{-9}$ cm$^2$/s or greater. Accordingly, it is preferable that the mold release sheet have a gas permeability of from $1.0 \times 10^{-9}$ cm$^2$/s to $1.0 \times 10^{-4}$ cm$^2$/s, particularly preferably from $1.0 \times 10^{-9}$ cm$^2$/s to $1.0 \times 10^{-6}$ cm$^2$/s.

(Peel Strength of Mold Release Sheet)

The mold release sheet of the present invention is adjusted to have a peel strength of 50 kPa or less. With such a configuration, the mold release sheet adhering to the product can be removed easily when the product is removed from the mold. Therefore, the post-processing work after the molding of the product can be finished within a short time.

(Smoothness of Mold Release Sheet)

When using the mold release sheet, the surface irregularity of the mold release sheet surface is transferred to the product surface. However, high surface smoothness may be required depending on the manufactured product. In the case of such a product, it is necessary to process the product so that the product surface will have predetermined smoothness after removing the mold release sheet, if the mold release sheet surface has poor smoothness.

Here, the mold release sheet of the present invention is adjusted to have an arithmetical mean surface roughness of 10 µm or less. Therefore, even when the shape of the mold release sheet surface, i.e., the surface irregularity, is transferred to the molded product, the smoothness of the product surface can be made high after removing the mold release sheet.

Accordingly, processing after removal of the mold release sheet is unnecessary if, as in the case of the mold release sheet, the surface smoothness of the mold release sheet is higher than the smoothness required for the product surface. On the other hand, even with a product that requires higher surface smoothness than the smoothness of the mold release sheet surface, the amount of the portion of the product that needs to be removed by the processing can be reduced. The process time for obtaining a predetermined smoothness can be shortened, and as a result, the production efficiency of the product is improved. Moreover, the thickness reduction of the product is prevented because the amount of the portion of the product that is removed is lessened; therefore, the production yield of the product improves. Furthermore, if the surface irregularity of the mold release sheet is less, the variation in planar thermal conductivity over the surface of the sheet is correspondingly smaller; therefore, heat can be supplied uniformly to the raw material.

By employing the following method, the mold release sheet of the present invention can be manufactured so as to have an arithmetical mean surface roughness of 10 µm or less as described above.

First, natural graphite, kish graphite, or the like is immersed in a liquid such as sulfuric acid or nitric acid, and is thereafter subjected to a heat treatment at 400° C. or higher, to form flocculent graphite (expanded graphite). This expanded graphite has a thickness of 1.0 mm to 30.0 mm and a bulk density of 0.1 Mg/m$^3$ to 0.5 Mg/m$^3$. The resulting expanded graphite is compressed to a thickness of 0.2 mm to 0.6 mm and a bulk density of 0.5 to 1.5 Mg/m$^3$, to form a mold release sheet.

At this time, formation of creases or the like on the surface of the mold release sheet is prevented by compressing the expanded graphite by roll-pressing at a feed rate of 20.0 m/min or less. Thereby, it is possible to manufacture a mold release sheet having an arithmetical mean surface roughness of 10 µm or less. It should be noted that the productivity of the expanded graphite is poor when the feed rate is less than 0.1 m/min. For this reason, it is preferable that the feed rate be from 0.1 m/min to 20.0 m/min, more preferably from 0.5 m/min to 15.0 m/min.

Figure 3:
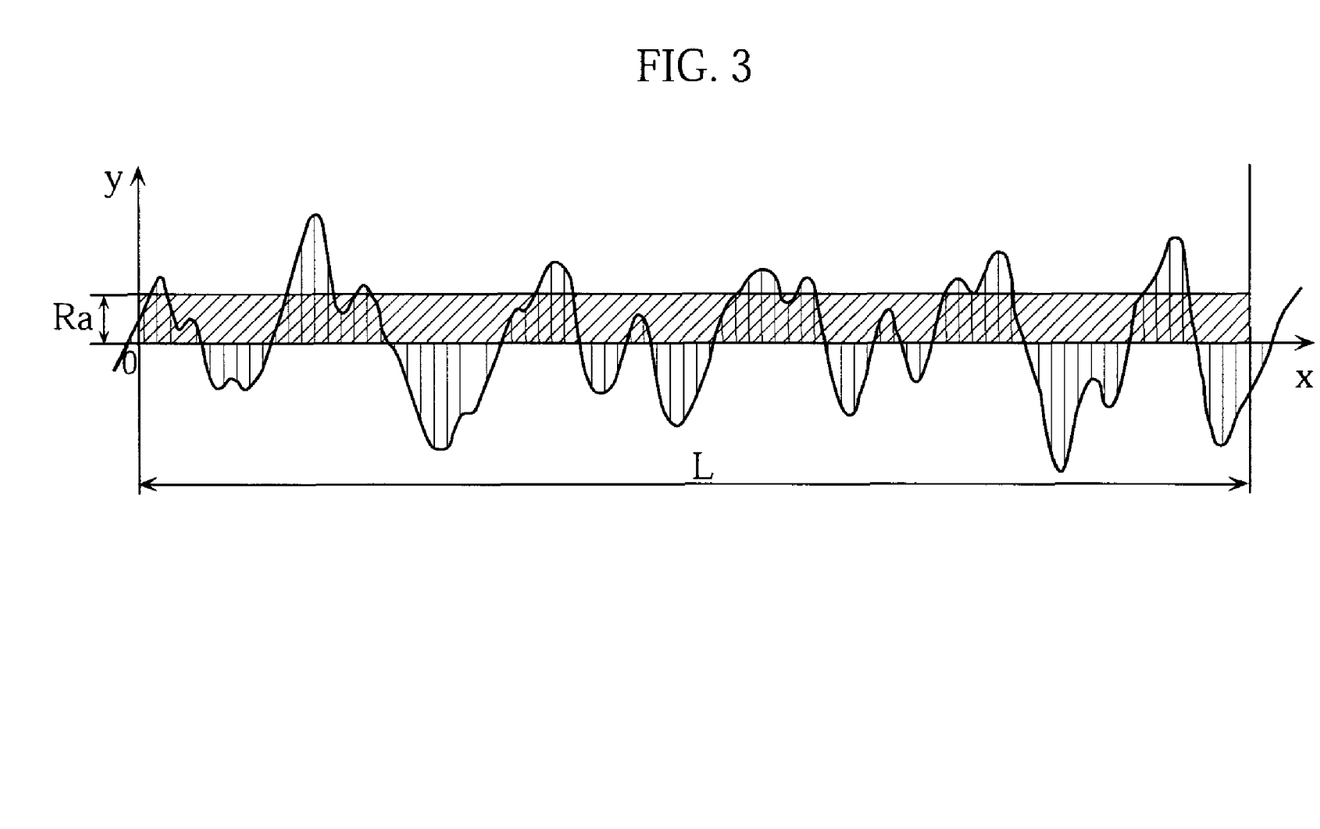
FIG. 3 is a graph for explaining surface roughness.

The arithmetical mean surface roughness is defined in JIS B 0601. Specifically, as shown in FIG. 3, arithmetical mean surface roughness (Ra) refers to a value obtained by the following equation 1, expressed in micrometers (μm), wherein a reference length L of a roughness curve is taken and the roughness curve is expressed as y=f(x), with the x-axis being along the mean line of the portion taken from the roughness curve and the y-axis being along vertical magnification.

$$Ra = \frac{1}{L}\int_0^L f(x)dx \quad\quad [\text{Eq. 1}]$$

(Thermal Conductivity of Mold Release Sheet)

Here, the mold release sheet of the present invention is adjusted to have a planar thermal conductivity of 100 W/(m·K) or greater. With this configuration, the temperature of the raw material can be elevated quickly, so the molding time can be shortened. As a result, the production efficiency improves remarkably.

In particular, when the mold release sheet of the present invention is manufactured according to the method described in the above section (Smoothness of Mold Release Sheet), its planar thermal conductivity also becomes uniform. More specifically, it becomes possible to produce the mold release sheet as described below. When portions of the mold release sheet are cut out in a square shape having a side of 200 mm to form square-shaped test regions each having a side of 25 mm and the thermal conductivity of each test region is measured, the quotient obtained by dividing the difference between the thermal conductivity of the test region having the greatest thermal conductivity and the thermal conductivity of the test region having the least thermal conductivity by the mean value of the thermal conductivities of all the test regions should be restricted to be 0.1 or less. As a result, formation of heat spots in the mold release sheet can be prevented. Therefore, the product can be heated uniformly, and a more uniform product can be manufactured.

(Compression Ratio of Mold Release Sheet)

The mold release sheet of the present invention is adjusted to have a compression ratio of 30% or greater. The compression ratio is represented in the foregoing equation (3).

With this configuration, the mold release sheet can change its shape so that it can absorb the difference in the amount of expansion/contraction between the raw material and the mold or the like even if the difference arises at the start of heating or at the time of cooling due to the difference in thermal expansion rate between the raw material and the mold or the like. As a result, the mold release sheet can prevent breakage of the product and the mold or the like.

(Thickness and Bulk Density of Mold Release Sheet)

Even though the mold release sheet of the present invention has a compression ratio as described above, a sufficient margin for shock absorption cannot be ensured if the thickness of the mold release sheet is too thin. In other words, there is a possibility that the difference in the amounts of expansion/contraction between the raw material and the mold or the like cannot be absorbed.

In addition, when the mold release sheet of the present invention is fitted between the raw material and the mold, the mold release sheet is bent and deformed so as to be in close contact with the raw material and the mold. At this time, if the strength of the mold release sheet itself is weak or the flexibility thereof is small, the mold release sheet itself may be cracked, chipped, or torn when it is bent and deformed even though the mold release sheet has a compression ratio as described above.

However, when the mold release sheet of the present invention has a thickness of from 0.2 mm to 1.5 mm and a bulk density of from 0.5 Mg/m³ to 1.5 Mg/m³, the mold release sheet has a certain degree of strength. Therefore, even when the mold release sheet is deformed, the mold release sheet can be prevented from cracks and so forth. Moreover, since the mold release sheet is not too thick, the mold release sheet can be bent easily and, even if it is bent, cracks and the like can be prevented. The mold release sheet can therefore be fitted to the mold or the like easily, and the mold release sheet can be fitted in a state in which the sheet is in close contact with the mold or the like.

As a result, the fitting work and the like for the mold release sheet can be performed within a short time, which contributes to shortening of not only the work hour for the fitting work for the mold release sheet but also the overall work hour of the molding process.

It is particularly preferable that the mold release sheet have a thickness of from 0.3 mm to 1.5 mm and at the same time have a bulk density of from 0.5 Mg/m³ to 1.5 Mg/m³. In this way, the mold release sheet has high bendability as well as high strength, so it is possible to prevent cracks and so forth of the mold release sheet more reliably.

(Ash Content of Mold Release Sheet)

Furthermore, in the manufacturing process of the mold release sheet of the present invention, it is desirable that the mold release sheet be adjusted to have an ash content of 30 ppm or less by treating the mold release sheet with a halogen gas or the like. This prevents contamination of the material to be molded because the ash content in the mold release sheet is low, enabling the molded product to have higher quality.

EXAMPLES

First Example

Figure 4:
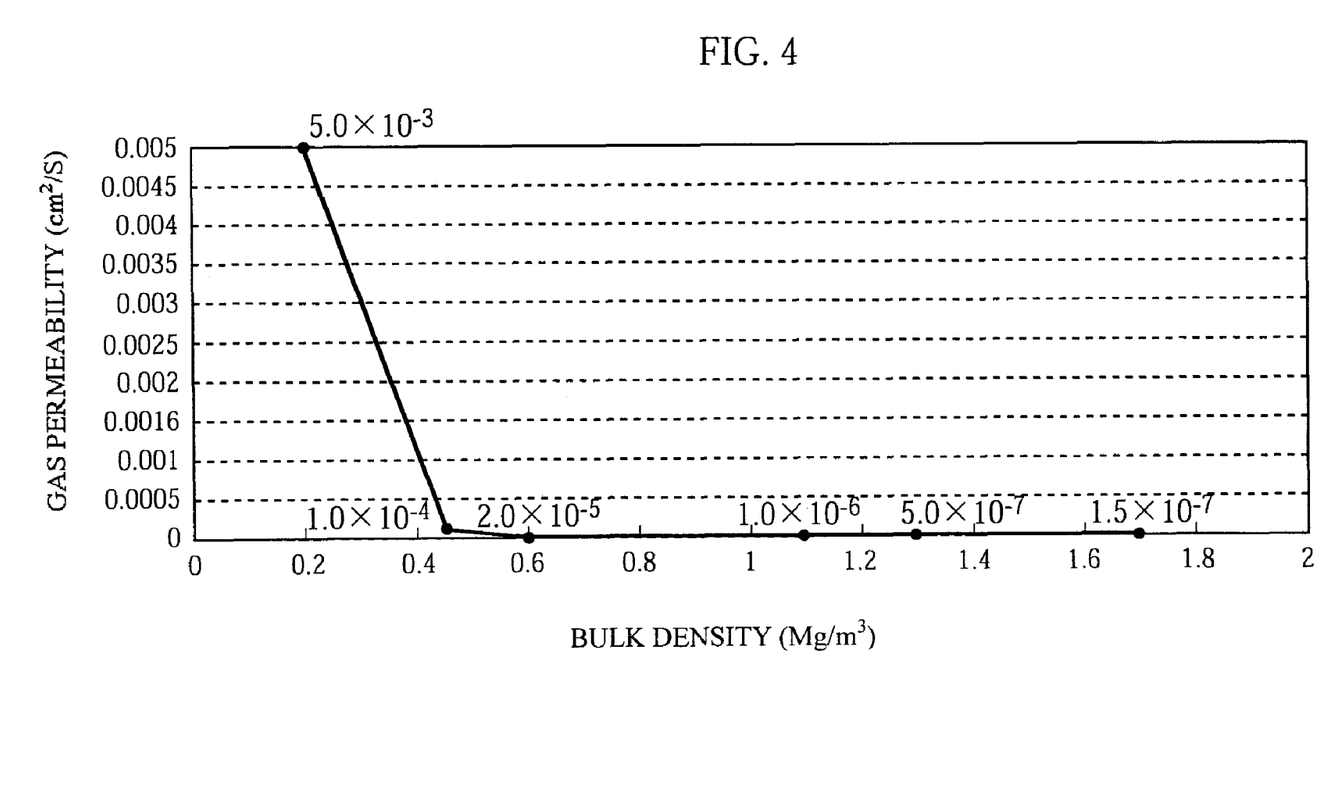
FIG. 4 is a graph for illustrating the relationship between the bulk density and the gas permeability of a mold release sheet.

The relationship between gas permeability and bulk density of the mold release sheet of the present invention was studied. The results are shown in FIG. 4.

(1) The measurement was carried out to determine the gas permeability of the mold release sheet having a thickness of 0.5 mm and an arithmetical mean surface roughness of 10 μm or less, when the bulk densities were set at 0.1, 0.3, 0.5, 0.7, 1.0, 1.5, and 1.7 Mg/m³.

The mold release sheet was adjusted to have an ash content of 30 ppm or less with a halogen gas.

The gas permeability was measured in the following method.

(1) In a pair of hermetically closed chambers CA and CB that are in communication with each other, a mold release sheet of the present invention (diameter 30 mm) is disposed so as to close the passage (diameter 10 mm) that allows the two chambers CA and CB to communicate with each other. In other words, the air is not permitted to flow between the pair of hermetically closed chambers CA and CB unless the air passes through the mold release sheet.

(2) From this condition, the chambers CA and CB are evacuated until the air pressure in the two chambers CA and CB becomes $1.0\times10^{-4}$ Pa. Then, while one of the chamber CA is being kept evacuated, $N_2$ gas is supplied until the other one of the chamber CB reaches a predetermined pressure ($1.0\times10^5$ Pa).

(3) When the other one of the chamber CB reaches a predetermined pressure ($1.0\times10^5$ Pa), the evacuation of the one of the chamber CA is stopped. Then, the $N_2$ gas gradually flows from the other one of the chamber CB to the one of the chamber CA according to the pressure difference between the two chambers CA and CB and the gas permeability of the mold release sheet. As a result, the pressure in the one of the chamber CA increases.

(4) Then, the rate of pressure increase in the one of the chamber CA was measured for about 100 seconds after stopping the evacuation of the one of the chamber CA, and the gas permeability K ($cm^2$/s) was calculated according to the following equation (1).

$$\text{Gas permeability } K=Q \cdot L/(\Delta P \cdot A) \qquad (1)$$

In the above equation (1), Q is the gas flow rate (Pa·$cm^3$/s), ΔP is the pressure difference (Pa) between two chambers, A is the gas transmission area ($cm^2$) of the mold release sheet, which is the area of a passage that allows the two chambers to communicate with each other, and L is the thickness (cm) of the mold release sheet. The gas flow rate Q can be calculated from the volumetric capacity of the one of the chamber CA and the rate of pressure increase inside the one of the chamber CA for about 100 seconds after stopping the evacuation of the one of the chamber CA.

As shown in FIG. 4, it is confirmed that when the bulk density is greater, the gas permeability is lower, in other words, when the bulk density is greater, the gas shielding capability is higher.

Second Example

Figure 8:
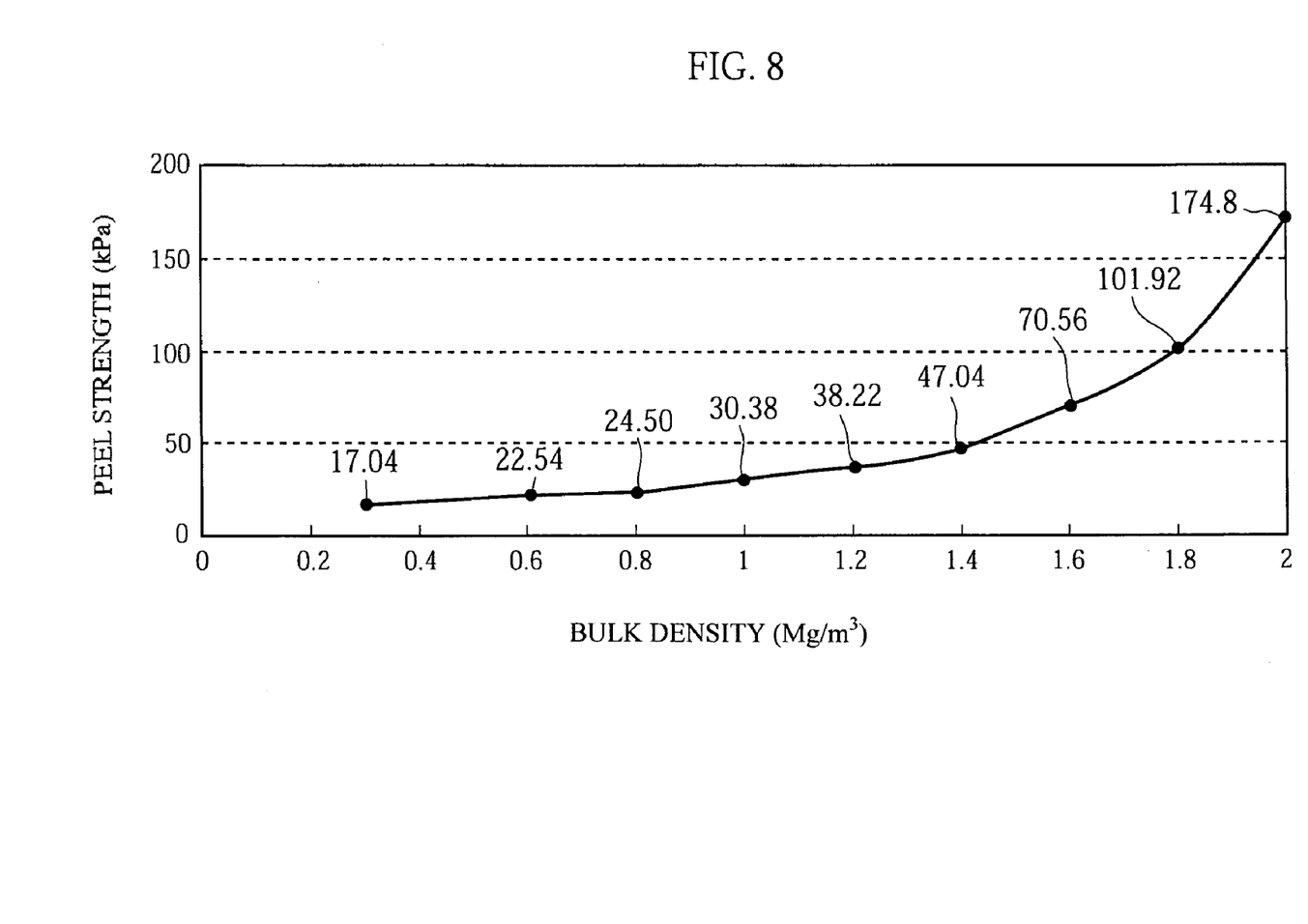
FIG. 8 is a graph for illustrating the relationship between the bulk density and the peel strength of the mold release sheet.

The relationship between peel strength and bulk density of the mold release sheet of the present invention was studied. The results are shown in FIG. 8.

The measurement was carried out to determine the peel strength of the mold release sheet having a thickness of 0.5 mm and an arithmetical mean surface roughness of 10 μm or less, when the bulk densities were set at 0.3, 0.6, 0.8, 1.0, 1.2, 1.4, 1.6, 1.8, and 2.0 Mg/$m^3$. The mold release sheet was adjusted to have an ash content of 30 ppm or less with a halogen gas.

Here, the method for measuring the peel strength of the mold release sheet of the present invention will be described below.

Figure 5:
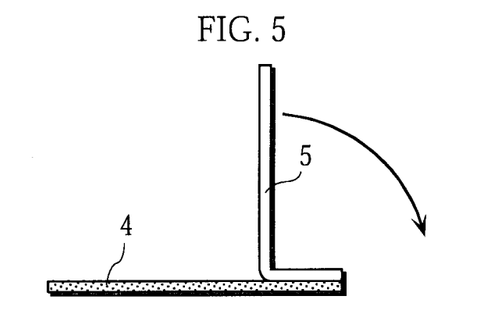
FIG. 5 is an illustrative view showing a method of preparing a test specimen used for a peel strength measurement.
Figure 6:
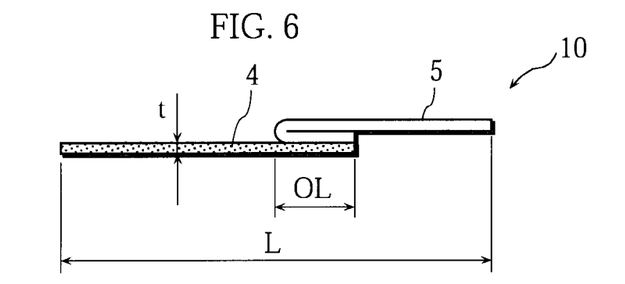
FIG. 6 is an illustrative view showing a method of preparing a test specimen used for a peel strength measurement.
Figure 7:
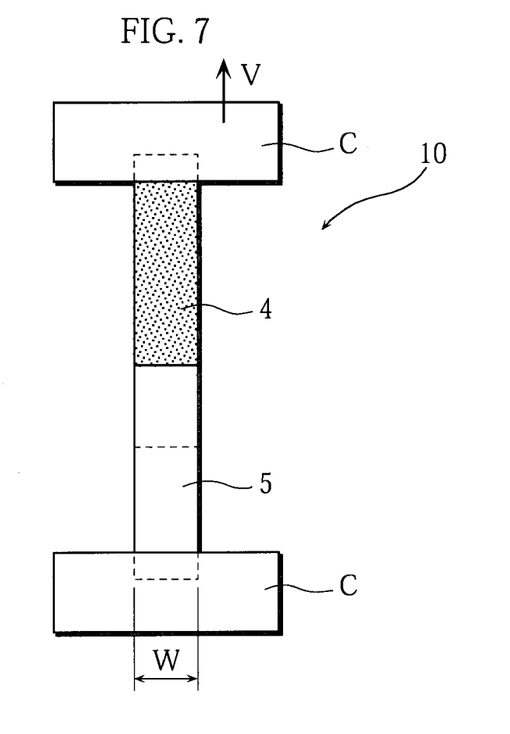
FIG. 7 is an illustrative view showing a method for measuring peel strength.

FIGS. 5 to 7 are views for illustrating the method for measuring the peel strength. In FIGS. 5 to 7, reference numeral 4 denotes a mold release sheet of the present invention. As shown in FIG. 7, the measurement for the peel strength was carried out as follows. One end of a tape 5 having an adhesive layer, such as a Dunplon tape, is adhered to the surface of one end of the mold release sheet 4, and the other end of the mold release sheet 4 and the other end of the tape 5 are pulled. The load at which the tape and the mold release sheet have been peeled from each other is measured.

(1) Method of Preparing Test Specimen

First, as illustrated in FIG. 5, one end of the mold release sheet 4 of the present invention and one end of the tape 5 were bonded to each other so that the dimensions of the bonded portion were width W 25 mm×length OL 10 mm (see FIGS. 6 and 7 for the width W and the length OL), and both were compression-bonded by a crimping tool such as rollers (crimping rate: about 5 mm/s, rolled back and forth one time).

After compression-bonding the mold release sheet 4 and the tape 5 with each other, the tape 5 was folded over while the one end of the tape 5 is kept bonded to the sheet, as shown in FIG. 6. At this time, care must be taken so that the surface of the tape 5 that has been folded over is parallel to the bonded surface, i.e., parallel to the surface of the mold release sheet 4.

Lastly, the mold release sheet 4 and the tape 5 were cut so as to adjust the overall length L of the test specimen 10 to be 100 mm.

(2) Method for Measuring Peel Strength Using Test Specimen 10

First, as illustrated in FIG. 7, opposite ends of the test specimen are fitted to chucks C so that the test specimen is kept level. Then, a load is applied in directions such that the opposite ends of the test specimen are moved away from each other at a uniform velocity V [20 (mm/min)]. In other words, the opposite ends of the test specimen 10 are pulled in the directions such as to be moved away from each other.

As the load to the test specimen 10 is increased, the tape 5 on the test specimen 10 is peeled off from the mold release sheet 4. The peel strength T of the mold release sheet 4 is obtained from the load LD at which this peeling has started, according to the following equation (2):

$$T=LD/(W \cdot t). \qquad (2)$$

In the equation (2), t is the thickness of the mold release sheet 4, and W is the width of the bonded portion.

A Dunplon tape No. 3505 (made by Nitto Denko Corp.) was used for the tape 5.

The measuring device used was a materials testing machine Instron 4301. The mold release sheet 4 of the present invention was fitted to an upper chuck of the testing machine and the tape 5 was fitted to a lower chuck thereof so that the test specimen was kept level. A load was applied thereto at a uniform velocity of 20 (mm/min). The maximum load at which peeling occurred between the two was recorded, and according to the load, the peel strength was obtained.

The start of the peeling was determined by the torque applied to the machine.

As shown in FIG. 8, it was confirmed that the greater the bulk density is, the greater the peel strength. It was also confirmed that the peel strength was significantly great at a bulk density of from 1.4 Mg/$m^3$ to 1.6 Mg/$m^3$.

Third Example

The compression ratio was determined for samples of the mold release sheet of the present invention when compressing the mold release sheet with a pressure of 34.3 MPa in a thickness direction, and the relationship between bulk density and compression ratio was confirmed. The results are shown in FIG. 9.

The measurement for the compression ratio was carried out for the mold release sheets each having a thickness of 0.5 mm and having bulk densities of 0.1, 0.5, 0.8, 1.0, 1.2, 1.5, and 1.8 Mg/$m^3$.

Figure 9:
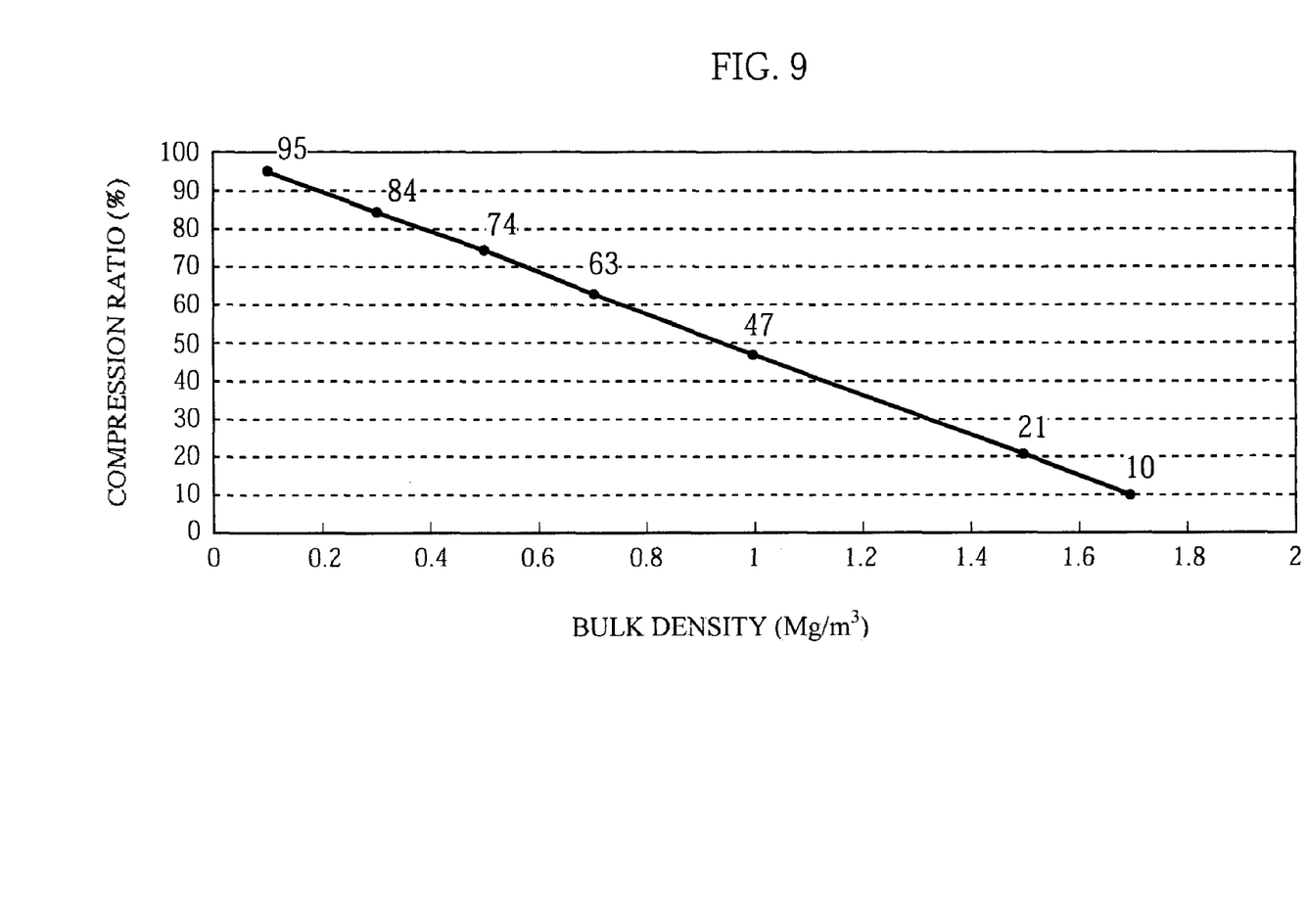
FIG. 9 is a graph for illustrating the relationship between the bulk density and the compression ratio of the mold release sheet.

As shown in FIG. 9, it is confirmed that when the bulk density is greater, the compression ratio is lower.

Fourth Example

The mold release sheets having thicknesses of 0.2 mm to 0.6 mm and bulk densities of 0.5 Mg/$m^3$ to 1.5 Mg/$m^3$ according to the present invention were compared in terms of non-uniformity in thermal conductivity. The results are shown in Table 1.

The non-uniformity in thermal conductivity was determined as follows. 9 pieces of test specimens each with dimensions of 25×25 mm were cut out from each samples of the mold release sheet of the present invention with dimensions of 200×200 mm. The quotients each obtained by dividing the difference between the maximum value (Max.) and the minimum value (Min.) of the planar thermal conductivity of each test specimen by the average thermal conductivity (Ave.) were compared.

TABLE 1

| | | Thickness (mm) | |
|---|---|---|---|
| | 0.2 | 0.4 | 0.6 |
| Bulk density (Mg/m³)  0.5 | 0.08 | 0.07 | 0.06 |
| 1.0 | 0.07 | 0.06 | 0.05 |
| 1.5 | 0.08 | 0.07 | 0.06 |

The unit for planar thermal conductivity is W/(m·K).

As shown in Table 1, the non-uniformity in the thermal conductivity of the mold release sheet of the present invention is less than 0.1. The mold release sheet of the present invention proved to show good uniformity in thermal conductivity.

INDUSTRIAL APPLICABILITY

The mold release sheet of the present invention is suitable for a sheet used for preventing damage to a mold and contamination of the raw material in manufacturing silicon carbide (SiC), aluminum nitride, synthetic quartz, and the like.

BRIEF DESCRIPTION OF THE DRAWINGS

FIG. 1 is a schematic illustrative view of equipment for fabricating synthetic quartz and the like.

DESCRIPTION OF REFERENCE NUMERALS 1 mold
4 mold release sheet
M silica powder

The invention claimed is:

1. A mold release sheet disposed between a mold and a material to be molded, the mold release sheet comprising expanded graphite, characterized in that:
the $N_2$ gas permeability represented by the following equation (1) is from $5.0 \times 10^{-7}$ cm²/s to $1.0 \times 10^{-4}$ cm²/s, $$N_2 \text{ Gas permeability} = Q \cdot L / (\Delta P \cdot A), \quad (1)$$

where Q is the gas flow rate (Pa·cm³/s), ΔP is the pressure difference (Pa) between two chambers, A is the gas transmission area (cm²) of the mold release sheet, which is the area of a passage that allows the two chambers to communicate with each other, and L is the thickness (cm) of the mold release sheet.

2. The mold release sheet according to claim 1, wherein the arithmetical mean surface roughness is 10 μm or less.

3. The mold release sheet according to claim 1, wherein the planar thermal conductivity is 100 W/(m·K) or greater.

4. The mold release sheet according to claim 1, wherein the compression ratio represented by the following equation (3) is 30% or greater:

$$\text{Compression ratio (\%)} = [(t_1 - t_2)/t_1] \times 100, \quad (3)$$

where $t_1$ is the thickness (mm) of the mold release sheet after applying a pre-load (0.686 MPa±1%) for 15 seconds, and $t_2$ is the thickness (mm) of the mold release sheet after applying a total pressure (34.3 MPa±1%) for 60 seconds.

5. The mold release sheet according to claim 4, wherein the compression ratio represented by the equation (3) 30% or greater and is 80% or less.

6. The mold release sheet according to claim 1, wherein the bulk density is from 0.5 Mg/m³ to 1.5 Mg/m³.

7. The mold release sheet according to claim 1, wherein the thickness is 1.5 mm or less.

8. The mold release sheet according to claim 7, wherein the thickness is 0.2 mm or greater and 1.5 mm or less.

9. The mold release sheet according to claim 1, wherein the mold release sheet contains an ash content of 30 mass ppm or less.

* * * * *